US012647006B2

(12) United States Patent
Büttner et al.

(10) Patent No.: US 12,647,006 B2
(45) Date of Patent: Jun. 2, 2026

(54) METHOD FOR PRODUCING A ROTOR OF AN ASYNCHRONOUS MACHINE

(71) Applicant: Innomotics GmbH, Nuremberg (DE)

(72) Inventors: Klaus Büttner, Hollstadt (DE); Klaus Kirchner, Windshausen (DE); Matthias Warmuth, Ostheim (DE)

(73) Assignee: Innomotics GmbH, Nuremberg (DE)

( * ) Notice: Subject to any disclaimer, the term of this patent is extended or adjusted under 35 U.S.C. 154(b) by 548 days.

(21) Appl. No.: 18/015,737

(22) PCT Filed: May 12, 2021

(86) PCT No.: PCT/EP2021/062591
§ 371 (c)(1),
(2) Date: Jan. 12, 2023

(87) PCT Pub. No.: WO2022/012801
PCT Pub. Date: Jan. 20, 2022

(65) Prior Publication Data
US 2023/0208259 A1      Jun. 29, 2023

(30) Foreign Application Priority Data
Jul. 14, 2020    (EP) ..................................... 20185753

(51) Int. Cl.
*H02K 15/023*        (2025.01)
(52) U.S. Cl.
CPC .................................. *H02K 15/023* (2025.01)
(58) Field of Classification Search
CPC .......................... H02K 15/023; H02K 2201/06
See application file for complete search history.

(56) References Cited

U.S. PATENT DOCUMENTS

| | | | | |
|---|---|---|---|---|
| 3,685,142 | A | * | 8/1972 | Deming ................. H02K 17/16 |
| | | | | 29/598 |
| 5,722,154 | A | * | 3/1998 | Dunlap ................ H02K 15/021 |
| | | | | 29/598 |

(Continued)

FOREIGN PATENT DOCUMENTS

| | | | | |
|---|---|---|---|---|
| DE | 3413519 | | 10/1985 | |
| DE | 102013202402 | A1 * | 8/2014 | .......... H02K 15/023 |
| EP | 1039618 | A1 * | 9/2000 | .......... H02K 15/023 |

OTHER PUBLICATIONS

Neff. D. et.al., Melting and Melt Treatment of Aluminum Alloys, ASM Handbook, vol. 2A, Aluminum Science and Technology (Year: 2018).*

(Continued)

*Primary Examiner* — Thomas J Hong
*Assistant Examiner* — Jose K Abraham
(74) *Attorney, Agent, or Firm* — Cozen O'Connor

(57)          ABSTRACT

A method for producing a rotor of an asynchronous machine includes providing a rotor lamination stack having grooves extending parallel to a rotor axis of the rotor, inserting conductor rods into the grooves such that the conductor rods protrude from end faces of the rotor lamination stack, wherein a twisting tool is placed at each of the end faces onto the protruding conductor rods and the twisting tools are twisted relative to each other, where the parallel grooves with the corresponding conductor rods also extend obliquely after the twisting and where the twisting tools are formed such that the protruding conductor rods remain parallel to the rotor axis when an oblique profile of the stack is produced, removing the twisting tools, providing first and second short-circuit washers, and axially pressing the short-circuit washers onto the conductor rods projecting perpendicularly from the end face of the rotor lamination stack.

8 Claims, 3 Drawing Sheets

(56)          References Cited

U.S. PATENT DOCUMENTS

| | | | |
|---|---|---|---|
| 6,088,906 A * | 7/2000 | Hsu .................... | B22D 19/0054 |
| | | | 310/211 |
| 2006/0152096 A1 * | 7/2006 | Helmi ...................... | H02K 5/15 |
| | | | 310/90 |
| 2013/0049518 A1 * | 2/2013 | Kleber ................. | H02K 15/023 |
| | | | 29/598 |
| 2013/0291373 A1 * | 11/2013 | Meyer ................. | H02K 15/023 |
| | | | 29/598 |
| 2016/0197539 A1 * | 7/2016 | Agapiou ............... | H02K 17/20 |
| | | | 29/598 |
| 2017/0019051 A1 | 1/2017 | Fujie et al. | |
| 2017/0054351 A1 * | 2/2017 | Ishikawa .................. | H02K 1/12 |
| 2018/0287444 A1 * | 10/2018 | Ulbrich .................... | H02K 1/28 |
| 2020/0395827 A1 * | 12/2020 | Zulaika ................. | H02K 1/276 |
| 2021/0167674 A1 * | 6/2021 | Tsuda ..................... | H02K 15/04 |

OTHER PUBLICATIONS

PCT International Search Report dated Aug. 17, 2021 based on PCT/EP2021/062591 filed May 12, 2021.

* cited by examiner

METHOD FOR PRODUCING A ROTOR OF AN ASYNCHRONOUS MACHINE

CROSS-REFERENCE TO RELATED APPLICATIONS

This is a U.S. national stage of application No. PCT/EP2021/062591 filed 12 May 2021. Priority is claimed on European Application No. 20185753.9 filed 14 Jul. 2020, the content of which is incorporated herein by reference in its entirety.

BACKGROUND OF THE INVENTION

1. Field of the Invention

The invention relates to a method for producing a rotor of an asynchronous machine, where the method comprises providing a laminated rotor core with slots that extend parallel to a rotor axis of the rotor, and inserting conductor rods into the slots such that the conductor rods protrude from the end faces of the laminated rotor core.

2. Description of the Related Art

In the lower power range, squirrel-cage rotors of dynamo-electric rotary machines are produced in one work step using pressure diecasting techniques. This material-fit method is cost-intensive because the dies are expensive and wear comparatively quickly. Moreover, during production, a comparatively high degree of variability is present in the quality of squirrel-cage rotors thus produced. This is evident, for example, in the change of quality of the melt in the crucible, impurities of the melt during the casting process, releasing agents or abrasion in the tool, and the formation of voids or stress cracks during cooling of the cast part.

In the higher power range or in special applications of dynamo-electric rotary machines, individual conductor bars are electrically and mechanically connected to a short-circuiting ring. This is achieved, for example, via soldering or welding operations as described in DE 34 13 519 C2.

It is however disadvantageous in the case of these larger dynamo-electric machines that short-circuiting rings are present that have a circumferential solder tank that must be completely filled with solder for the soldering process.

In this case, only the volume corresponding to the volume of the conductor bars projecting into the solder tank is not filled with solder. Owing to the high silver content in the solder, inter alia, production of the solder connection between conductor bars and short-circuiting ring is not particularly effective in economical terms.

In order to overcome the quality deficiencies, which also occur in the low power range, the diecasting operation is performed using a shielding gas, for example. Provision is also made for tools having multiple venting means, or even for modifying the alloy of the melt.

These interventions make it possible to increase the efficiency of the asynchronous squirrel-cage rotor, but additional measures are nonetheless required for stability, where the measures are particularly suitable for high rotational speeds, for example, reinforcing rings or alloys are used to achieve greater degrees of stability.

EP 3 402 507 A1 discloses a method for producing a squirrel-cage rotor of an asynchronous machine, that includes providing a laminated rotor core with slots which run substantially axially, and inserting conductor rods into the slots such that the conductor rods protrude from the end faces of the laminated rotor core, followed by compression using short-circuiting disks.

US 2016/0197539 A1 discloses pretensioning of the laminated rotor core via an axial retention force before the protruding bars are then bent. This results in compression of the core at the same time as generating a locking force via the bending.

SUMMARY OF THE INVENTION

It is an object of the present invention to provide a method for producing skewed rotors without the need for additional methods, such as pressure casting, welding or soldering.

This and other objects and advantages are achieved in accordance with the invention by a method for producing a rotor that includes providing a laminated rotor core with slots that extend parallel to a rotor axis of the rotor, and inserting conductor rods into the slots such that the conductor rods protrude from the end faces of the laminated rotor core.

By virtue of the twisting tool that is used, the protruding conductor rods can remain straight instead of being bent. It is advantageous that pre-prepared short-circuiting rings can then be pressed straight on in order to effect placement thereof.

In the field of asynchronous engineering, the rotor cores and associated conductor rods are generally formed to be skewed in order to create a cage winding with reduced torque undulation and improved starting characteristics. A twist of a slot in the rotor corresponds essentially to the angular distance of a stator slot. Using the method in accordance with the invention, rotor bars can easily be assembled to form once-transposed or twice-transposed cages. Cages with twice-transposed rotor bars are also called staggered-slot rotors. Transposing the rotor bars results in more favorable starting conditions, thereby reducing slot whistle, inhomogeneous torque, magnetic eddying, vibratory forces and retardation, for example.

It is considered a further crucial advantage of the inventive method that methods such as pressure casting, soldering or welding can be dispensed with and the rotor can be manufactured as part of an automated manufacturing process. The inserted conductor rods with the rotor core are then twisted in a screw-like manner, for example, in a twisting machine with a programmed deflection curve, such that stability is produced without welding and soldering. It was previously necessary for twisted rotor cores to be bedded in with aluminum or copper melts, this being excessively laborious and presenting an obstacle to automated manufacturing.

It is considered a further advantage of the method that the provision of a rotor core includes loosely lining up rotor laminations of the laminated rotor core, and the twisting results in a non-positive connection between the laminated rotor core and the conductor rods.

It is a further advantage that the short-circuiting rings are pressed onto a core that is stacked straight such that no bending of the conductor rods occurs, and the two external short-circuiting disks are only twisted relative to each other after this, thereby generating the skew and the non-positive connection between the laminated rotor core and the conductor rods.

Advantageously, use is preferably made of aluminum, copper or an aluminum or copper alloy as a material for the conductor rods and the short-circuiting disks.

When preparing to press on or force fit the short-circuiting disks, it is advantageous that these are heated above recrystallization temperature and the axial force-fitting of at least one short-circuiting disk onto the conductor rods protruding from the end face of the laminated rotor core is effected with subsequent or concurrent hot forming of the short-circuiting disks that are axially pushed-on, all while taking a temperature range, deformation and deformation rate into account. An advantageous temperature range for the short-circuiting disks during this process is found to be 400-500° Celsius. The deformation should be in the range of 0.5 and the deformation rate should be in the range of 1 to 4 per second.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail with reference to an exemplary embodiment, in which.

DETAILED DESCRIPTION OF THE EXEMPLARY EMBODIMENTS

Figure 1:
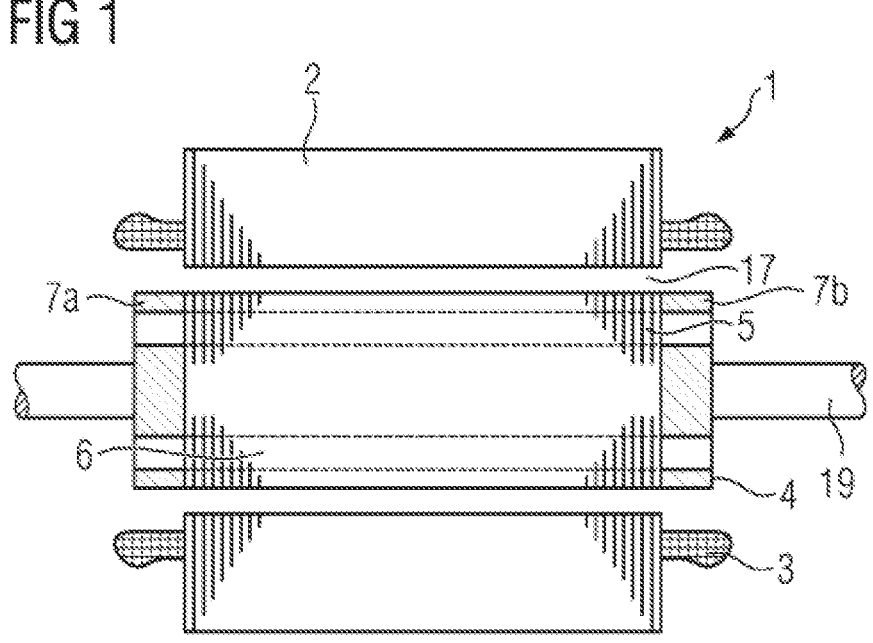
FIG. 1 shows a schematic longitudinal section of an asynchronous motor in accordance with the prior art.

FIG. 1 shows a schematic longitudinal section of an asynchronous machine 1 with a stator 2, this having at its end faces a winding system 3 that takes the form of end windings there. The winding system 3 in this case can be constructed, for example, using toothed coils, preformed coils, and tooth-wound coils of different or identical coil width.

An air gap 17 of the asynchronous machine 1 separates the rotor 4 from the stator 2. The rotor 4 has a laminated rotor core 5. A first short-circuiting disk 7a and a second short-circuiting disk 7b are arranged at the end faces 15a, 15b of the laminated rotor core 5. The rotor 4 is carried on a shaft 19.

Figure 2:
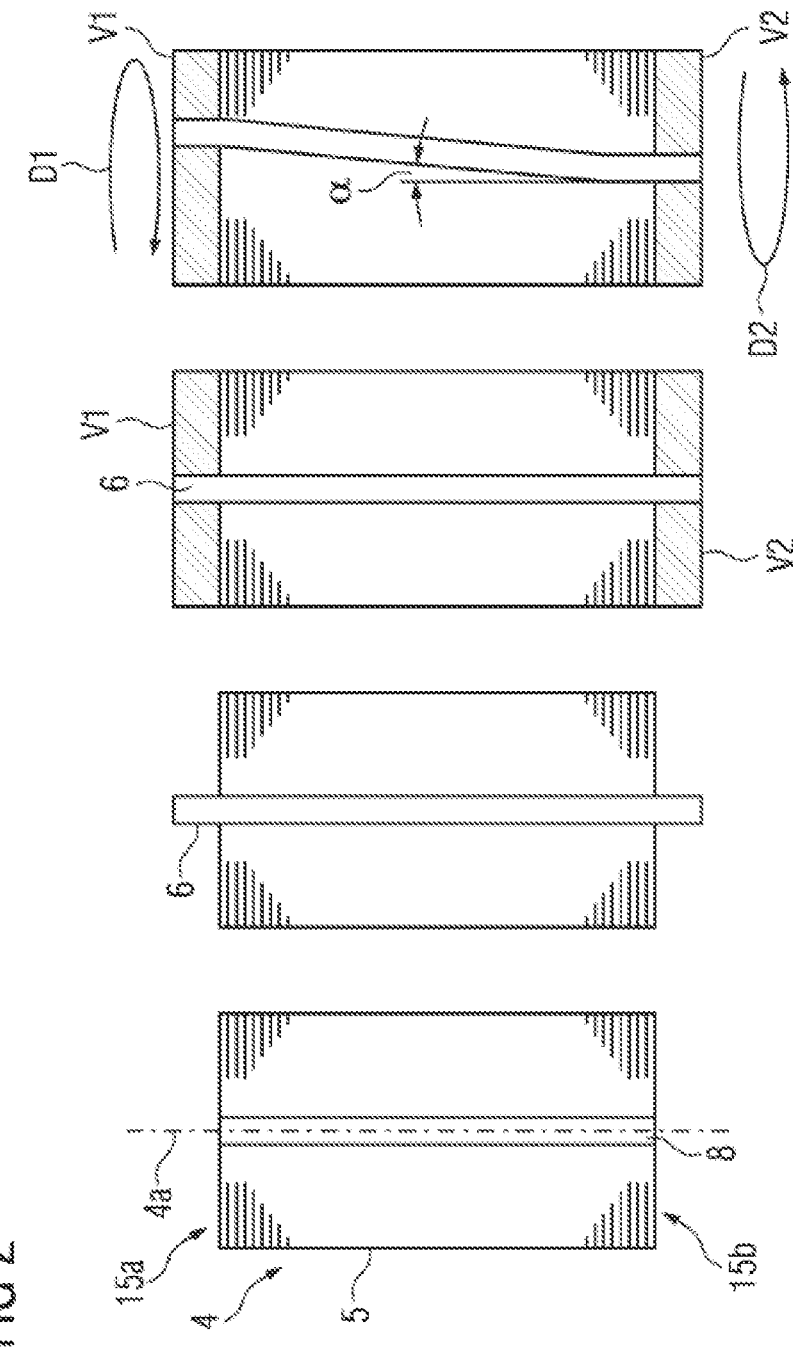
FIG. 2 shows the method steps from left to right with the twisting tool in accordance with the invention.

FIG. 2 illustrates the inventive method steps. The method steps run from left to right. In a first step, the laminated rotor core 5 is provided with slots 8 that extend parallel to a rotor axis 4a of the rotor 4. This can be effected in particular by loosely lining up individual rotor laminations to form the laminated rotor core 5. In a next step, conductor rods 6 are inserted into the slots 8. With respect to the simplified illustration, it should be noted that although only one slot 8 is depicted in the drawings, at least a second slot will be present on the opposite side.

Figure 3:
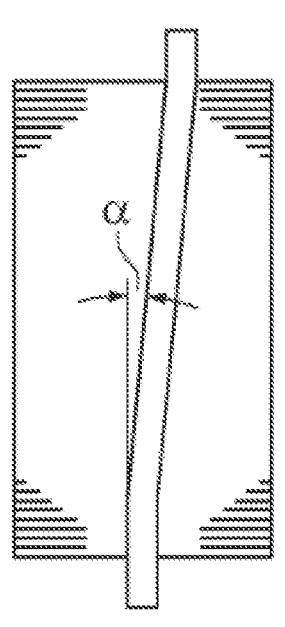
FIG. 3 shows the pressing on of the short-circuiting disks in accordance with the invention.
Figure 3:
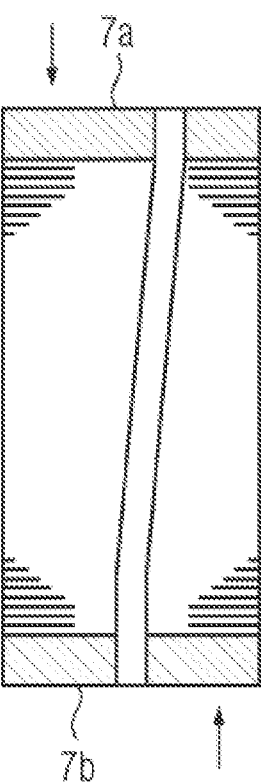

In a further step, a first and a second twisting tool V1,V2 are provided and the first and the second twisting tool V1,V2 are axially mounted on the conductor rods 6 protruding from the end faces 15a,15b of the laminated rotor core 5. In a next step, the first twisting tool V1 is twisted about a presettable angle α relative to the second twisting tool V2 via reciprocally opposing torques D1,D2, where the parallel slots 8 and the conductor rods 6 arranged therein then also extend in a skewed manner after the twisting has occurred. The twisting also involves a non-positive connection between the laminated rotor core 5 and the conductor rods 6. The axial force-fitting of the short-circuiting disks 7a,7b, taking into account an ideal temperature range for the deformation and the optimal deformation rate, is shown in FIG. 3. In this way, a plastic distortion occurs as a result of dislocation travel of the atomic planes in the lattice. This travel and therefore the overcoming of obstacles in the atomic lattice (for example, edge dislocation, and/or foreign atoms) is assisted by an increase in temperature. The deformability therefore increases with an effect from a specific material-dependent temperature threshold. The deformation rate, the temperature and the flow rate of the respective material must also be compatible with each other.

In this way, a microbond is formed between the material of the short-circuiting disks 7a,7b and the conductor rods 6. This microbond is produced as a result of the conductor rod 6 and the short-circuiting disks 7a,7b rubbing tightly against each other, thereby generating a surface pressure and further frictional heat. In this case, the permitted shear stress of these materials is locally exceeded and mass transfers are caused by diffusion at the boundary surface between the conductor rod 6 and the short-circuiting disk 7a,7b. This results in microwelds and microbonds.

In a next step, the first twisting tool V1 is twisted about a presettable angle α relative to the second twisting tool V2 via reciprocally opposing torques D1,D2, where the parallel slots 8 and the conductor rods 6 arranged therein then also extend in a skewed manner after the twisting has occurred. The twisting also involves a non-positive connection between the laminated rotor core 5 and the conductor rods 6.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a rotor of an asynchronous machine, the method comprising:

providing a laminated rotor core with slots which extend parallel to a rotor axis of the rotor;

inserting conductor rods into the slots such that the conductor rods protrude from end faces of the laminated rotor core;

mounting a twisting tool onto the conductor rods so as to protrude from each of the end faces, twisting tools being twisted relative to each other, and parallel slots with respective conductor rods also extending in a skewed manner after the twisting has occurred, and the twisting tools being configured such that protruding conductor rods remain parallel to the rotor axis when a skewed core is produced;

removing the twisting tools;

providing a first and second short-circuiting disk; and axially force-fitting first and second short-circuiting disks without welding and soldering onto the conductor rods protruding perpendicularly from the end faces of the laminated rotor core, such that after the axial force-fitting, a first end of the protruding conductor rod aligns with the rotor axis and a second end of the protruding conductor rod extends parallel to the rotor axis at an offset position.

2. The method as claimed in claim 1, wherein axial bracing is achieved as a result of pressing on the first and second short-circuiting disks.

3. The method as claimed in claim 1, wherein said providing the laminated rotor core includes lining up rotor laminations to form the laminated rotor core, and wherein said twisting produces a non-positive connection between the laminated rotor core and the conductor rods.

4. The method as claimed in claim 2, wherein said providing the laminated rotor core includes lining up rotor laminations to form the laminated rotor core, and wherein said twisting produces a non-positive connection between the laminated rotor core and the conductor rods.

5. The method as claimed in claim 1, wherein the conductor rods and the short-circuiting disks material comprises one of aluminum, copper, an aluminum alloy and copper alloy.

6. The method as claimed in claim 2, wherein the conductor rods and the short-circuiting disks material comprises one of aluminum, copper, an aluminum alloy and copper alloy.

7. The method as claimed in claim 3, wherein the conductor rods and the short-circuiting disks material comprises one of aluminum, copper, an aluminum alloy and copper alloy.

8. The method as claimed in claim 5, wherein at least the material of the short-circuiting disks is heated above the recrystallization temperature, and the axial force-fitting of at least one short-circuiting disk onto the conductor rods protruding from the end faces of the laminated rotor core is effected with subsequent or concurrent formation of the short-circuiting disks which are axially pushed-on, while taking a temperature range, deformation and deformation rate into account.

* * * * *